Oct. 7, 1958
U. RANZI
2,854,860
DRIVE SYSTEM FOR SELF-DRIVING RAILWAY
CARS AND FOR RAILWAY LOCOMOTORS
Filed Nov. 3, 1954
2 Sheets-Sheet 1
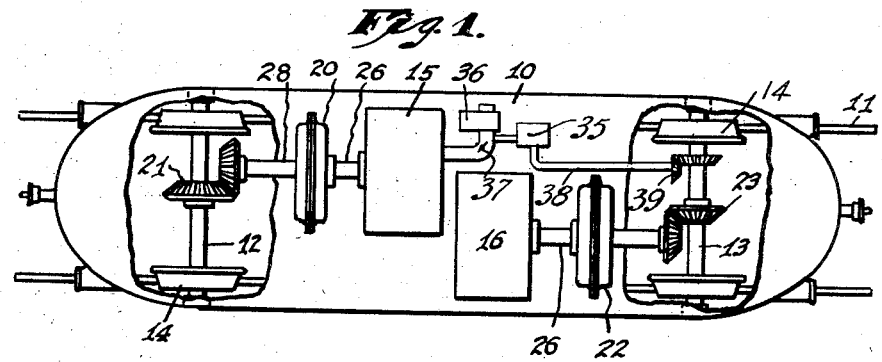
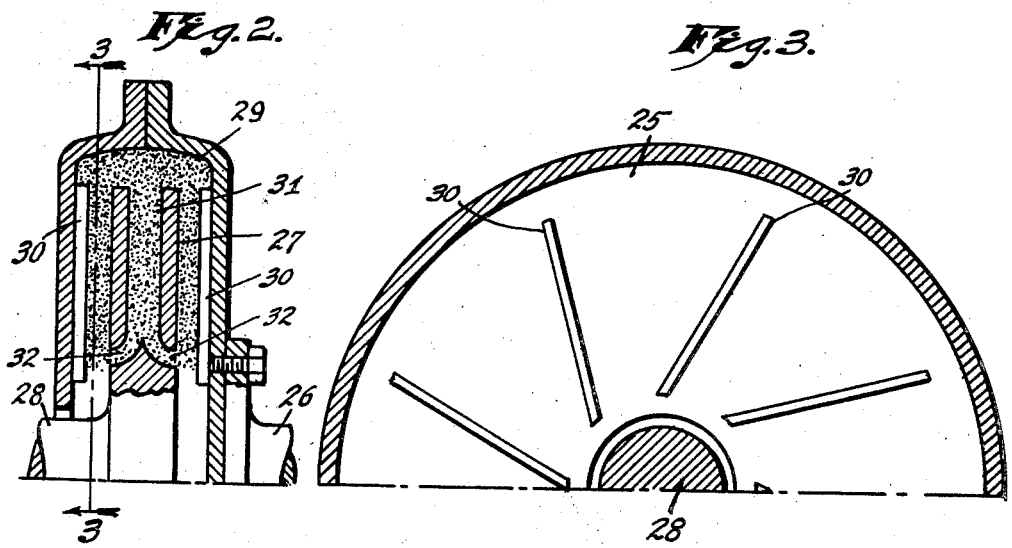
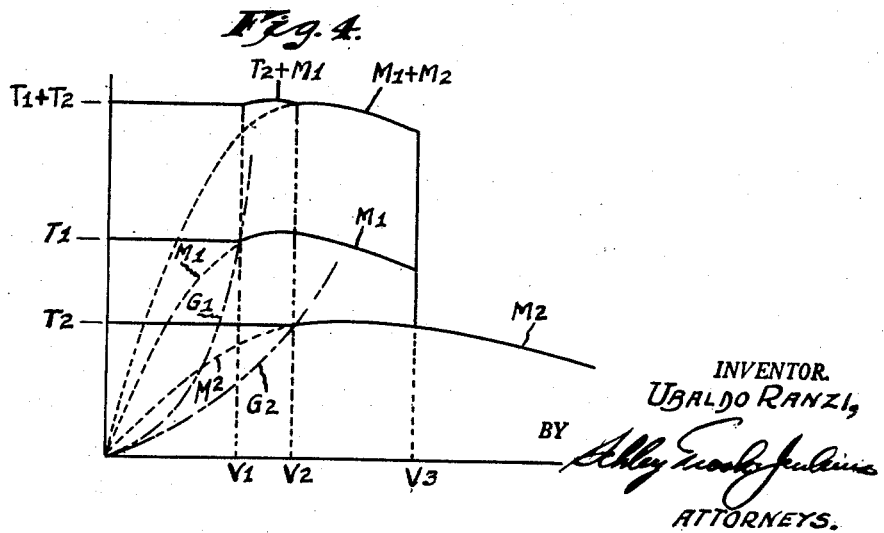
INVENTOR.
UBALDO RANZI,
BY
ATTORNEYS.

Oct. 7, 1958

U. RANZI 2,854,860

DRIVE SYSTEM FOR SELF-DRIVING RAILWAY
CARS AND FOR RAILWAY LOCOMOTORS

Filed Nov. 3, 1954

INVENTOR.
UBALDO RANZI,
BY
ATTORNEYS.

United States Patent Office 2,854,860
Patented Oct. 7, 1958

2,854,860

DRIVE SYSTEM FOR SELF-DRIVING RAILWAY CARS AND FOR RAILWAY LOCOMOTORS

Ubaldo Ranzi, Legnano, Italy

Application November 3, 1954, Serial No. 466,563

8 Claims. (Cl. 74—665)

This invention relates to a driving means for use in service where the torque required for starting is high relative to that required under normal running or operating conditions. An example of such service occurs in the operation of railroad trains and self-propelled railway cars. In such service the mass to be accelerated is large, and high starting torques are therefore desirable. At the same time, rolling friction is low and grades are slight, so that comparatively low torques are necessary to maintain normal running speed once that speed is attained. Such demands are in contrast to those imposed on the power plant and transmission of the ordinary automotive passenger vehicle, where the ratio of power to weight is much higher than would be economical in railroad service and where very substantial torques may be required at high speeds. Attempts have been made to produce internal combustion engines possessing a relatively rapid rise in output torque upon acceleration from idling speed; but even with such engines, the high starting torques involved in railroad service require complicated and relatively expensive change-speed transmission mechanism through which power from the engine or engines is transmitted to the drive wheel.

It is therefore an object of this invention to provide a driving means which can employ power sources, such as internal combustion engines, of conventional torque-output characteristics but which, without need for complicated and expensive change-speed transmission mechanisms, can meet the relatively high starting torque and relatively low running torque characteristics required in railroad service.

In carrying out the invention in its preferred form I employ two independently controllable power sources or engines connected to the drive wheels through independent power transmission mechanisms each of which embodies a speed-responsive coupling the torque transmitted by which varies in the same sense as does the speed of rotation. The independent power-transmission mechanisms provide different effective ratios of speed reduction, and at least the mechanisms of greater ratio possesses the capability of overrunning. In the preferred arrangement, such overrunning capability is provided by use of a speed-responsive coupling having unidirectional characteristics. The engine associated with the power-transmission mechanism of greater speed-reducing ratio is equipped with a governor responsive to speed of the driven vehicle and operative to bring such engine to idling speed or stop it entirely whenever the speed of the vehicle is at or above a predetermined maximum. When such a system is placed in operation, the initial load imposed on the engines is low, as the speed-responsive couplings are capable at low speeds of transmitting only low torques. As speed increases, however, the couplings transmit an ever-increasing torque to the driving wheels. If the two engines are the same, the greater portion of such torque will be provided by the engine associated with the transmission mechanism of greater speed-reducing ratio, which engine will hereinafter be identified as the first engine. That engine will attain its maximum torque output before the second engine does, and in the later stages of acceleration there will be an interval during which the effective torque output of the first engine is decreasing while that of the second engine is increasing. When the vehicle attains some predetermined speed, the first engine is thrown out of effective operation by the aforesaid governor.

Instead of relying upon power-transmission mechanisms of different effective ratios associated with the respective engines to provide that the respective maximum torque outputs will be attained at different vehicle speeds, I may obtain the same result by employing engines having different torque-output characteristics such that the first engine will attain its maximum torque at an engine speed less than that at which the second engine produces its maximum output torque.

The accompanying drawing illustrates the invention:

Fig. 1 is a diagrammatic plan view illustrating a self-propelled railroad vehicle equipped with my driving system;

Fig. 2 is a fragmental axial section showing a type of speed-responsive, unidirectional coupling suitable for use in the practice of my invention;

Fig. 3 is a transverse section on the line 3—3 of Fig. 2;

Fig. 4 is a diagram representing torque-changes as the speed of the vehicle varies;

Figure 5:
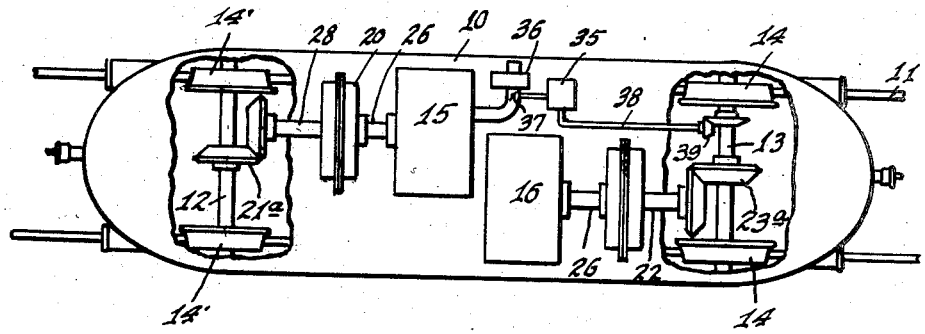
Fig. 5 is a view similar to Fig. 1 illustrating a modification of the invention in which the difference in effective drive ratios of the two engines it attained by having one engine drive wheels of one diameter and the other engine drive wheels of a different diameter.

The vehicle shown in Fig. 1 comprises a frame or body 10 supported from tracks 11 through a pair of longitudinally spaced driving axles 12 and 13 equipped with wheels 14 running on the tracks 11. On the body 10 are mounted two power-sources, such as internal combustion engines 15 and 16, drivingly connected respectively to the two axles 12 and 13. As shown, the first engine 15 is connected to the axle 12 through a speed-responsive coupling 20 and gearing 21, while the second engine 16 is connected to the axle 13 through a speed-responsive coupling 22 and gearing 23. The two sets of gearing possess different speed ratios so that if there was no slippage between the wheels 14 and the rails 11 or within the couplings 20 and 21 the two engines would operate at different speeds in driving the vehicle. Ordinarily, the two sets of gearing would be speed-reducing in character; and in the particular arrangement illustrated the gearing 21 associated with the first engine 15 would provide greater speed-reduction than the gearing 23.

At least the power-transmission mechanism associated with the first engine 15 possesses overrunning capabilities, and preferably the other transmission mechanism also possesses such capabilities. To this end, the two speed-responsive couplings 20 and 22 may be of unidirectional type. One form of speed-responsive, unidirectional coupling suitable for use in the practice of my invention is shown and described in my prior U. S. Patent No. 2,706,547, granted April 19, 1955. An example of such a coupling is illustrated in Fig. 2, where the coupling is shown as comprising a driving element in the form of a housing 25 adapted for direct connection as through a shaft 26 to an engine, an inner disk-like element or rotor 27 adapted for connection as through a shaft 28 to the speed-reducing gearing, and a supply of powder or other particulate material 29 contained within the housing 25 and serving to transmit torque between the housing and the rotor 27. The opposed inner walls of the housing 25 are provided with spirally inclined powder-engaging elements 30 which serve to urge the powder outwardly when the casing 25 is rotated in the driving direction. The inner element or rotor is provided with a passage or passages 31 extending radially inwardly from its periphery and terminating in ports 32 near the coupling-axis.

The torque which can be transmitted in the driving direction by a coupling of the type shown in Fig. 2 depends essentially upon the quasi-hydraulic pressure existing within the mass of powder 29, which distributes itself circumferentially of the coupling under the influence of centrifugal force when the coupling is operated. As a result of such pressure, the powder bears aaginst the surfaces of the rotor and housing creating friction which opposes relative rotation of the two coupling elements. At low speeds, the centrifugal force is low, the pressure of the powder on the coupling elements is relatively light, and the coupling is capable of transmitting only a small torque. If that small torque is insufficient to overcome the load on the driven rotor, such rotor 27 remains stationary. If the speed of the housing 25 increases, centrifugal force increases and the torque applied to the rotor becomes greater until, if the coupling is properly designed, the rotor begins to rotate. The powder-engaging elements 30 are so inclined with reference to the direction of rotation that they urge the powder outwardly, thus augmenting the effect of centrifugal force in creating pressure within the powder mass. During periods in which the coupling is slipping, the powder between the opposed side faces of the rotor and housing is forced to move outwardly by the inclined powder-engaging elements, and the powder thus moved outwardly returns toward the axis of the coupling through the passage 31 and ports 32. This circulation of the powder, as brought out in my prior patent above referred to, aids in the dissipation of heat and prevents injury to the powder such as might result from its subjection to excessively high temperatures created by friction at the surfaces where the powder engages the coupling elements.

After the driven rotor 27 begins to rotate and the speed of the housing 25 continues to increase, a progressively increasing torque is applied to the rotor and eventually, if the coupling is properly designed for its purpose, the rotor attains the same speed as the housing and the powder-circulation ceases. Upon any tendency to overrun, the inclined powder-engaging elements 30 urge inwardly the powder they engage, thus acting in opposition to centrifugal force, reducing the pressure within the powder, and permitting the housing 25 to overrun the rotor 27. A coupling of the type shown in Figs. 2 and 3 therefore performs a two-fold function, serving first as a speed-responsive clutch in which the torque transmitted increases with increasing speed in the driving direction and second as a unidirectional clutch permitting the driven coupling element to overrun the driving element.

The engine 15 is equipped with a governor 35 responsive to vehicle speed and capable of bringing the engine 15 to idling speed or rendering it completely inoperative whenever the vehicle is running at or above some predetermined maximum speed. As shown, the engine 15 has an induction system 36 provided with a throttle 37 operated by the governor 35, and the governor 35 is operatively connected through a flexible shaft 38 and gearing 39 with the axle 13.

The manner in which my driving system operates will become apparent from a consideration of the curve diagram constituting Fig. 4, in which abscissae represent vehicle speed and the ordinates represent torques applied to the driving wheels. The curves M1 and M2 indicate, respectively, the torques applied to the axles by the two engines 15 and 16 assuming no slippage in the couplings 20 and 22. In other words, the two curves M1 and M2 are the torque-output curves of the two engines modified horizontally to take account of the speed changes provided by the gearing 21, 23. The curves G1 and G3 respectively represent the torques transmitted by the couplings 20 and 22 at engine speeds which, in the absence of coupling-slippage, would correspond to the abscissae-indicated vehicle speeds. Because the curves M1 and M2 take account of the fact that the gearing 21 provides a greater speed reduction than the gearing 23, the curve M1 would lie above the curve M2 with its maximum ordinate to the left of that of curve M2, even if the two engines 15 and 16 were identical in torque-output characteristics.

Curve G1 intersects curve M1 at a point corresponding to a torque T1 and a vehicle-velocity V1. This indicates that when the vehicle attains a speed V1 the engine 15 will be applying a torque T1 to the driving axle 12 and that slippage of the coupling 20 has ceased or will promptly cease. Similarly, the curves G2 and M2 intersect at a point corresponding to a torque T2, less than the torque T1, and to a velocity V2, greater than the velocity V1. In the interval required to increase vehicle speed from V1 to V2, the engine 15 is connected to the drive axle 12 without slippage of the coupling 20; but the coupling 22 will continue to slip until the vehicle attains the velocity V2. When the velocity V2 has been reached, both engines are connected to their respective drive axles without slippage but at different ratios, so that the engine 15 will be operating at a higher speed than the engine 16. At some speed V3, higher than the speed V2 and preferably a speed corresponding to or approaching the desired operating speed of the vehicle, governor 35 acts to throw the engine 15 out of effective operation, either by bringing it to idling speed or by rendering it completely inoperative. Thereafter, so long as the vehicle-speed remains above V3, the vehicle continues to be driven solely by the engine 16, the coupling 20 overrunning and permitting the engine 15 to idle or remain stationary.

The above description of operation assumes that until the attainment of the velocity V2 both engines will be operating at full-throttle and that the engine 16 will continue to operate at full-throttle after the speed V3 has been reached. It will be understood, however, that the engines may be provided with manually controlled throttle-operating means by which the speed of the vehicle may at any time be reduced below that which would otherwise obtain.

Preferably, the couplings 20 and 22 are so designed that each of the curves G1 and G2 intersects its associated curve M1 or M2 at a speed somewhat below that at which maximum output torque of the associated engine is reached. Neither coupling should lock-up or become free from slippage at too low an engine speed, as otherwise stalling might occur.

It will be noted from Fig. 4 that the total torque available for acceleration, even if the engines are identical, may be more than twice the maximum torque provided by the one engine 16 necessary to maintain normal running speed of the vehicle. The duplication of power plants involves some additional expense; but that is offset, in large part if not in its entirety, by elimination of expensive change-speed transmissions, by the fact that the invention makes it possible to employ engines manufactured economically in high-quantity production rather than engines manufactured in small quantities to meet the peculiar demands of railway service, by economy of operation, and by the fact that the application of accelerating torque is continuous.

It will be understood that while the different effective drive ratios possessed by the two engines are shown as provided by different ratios of the gear-sets 21 and 23 the same result could be obtained by employing gear-sets of the same ratio and providing the axles 12 and 13 with wheels of different diameters. Such an arrangement is illustrated in Fig. 5, which is similar to Fig. 1 except that the two gear sets 21a and 23a possess the same ratio, while the wheels 14' on the axle 12 are smaller than the wheels 14 on the axle 13 to provide for the engine 15 a greater over-all effective speed reduction ratio than that provided for the engine 16.

Figure 6:
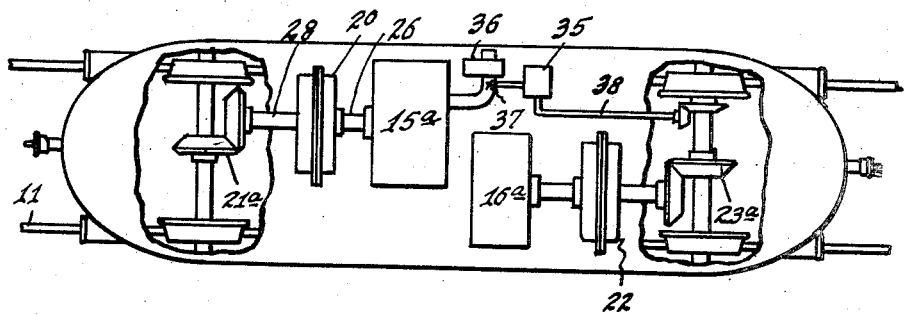
Fig. 6 illustrates another modification of the invention in which the effective ratios of the power-transmission mechanisms are the same but the engines have different torque-output characteristics.

As in Fig. 5, Fig. 6 shows the gear sets 21a and 23a as possessing the same ratio; but in this instance the feature characteristic of my invention is obtained by so constructing the engine 15a with which the governor 35 is associated that its maximum torque output is attained at a speed well below that at which the engine 16a attains its maximum torque output.

Figure 7:
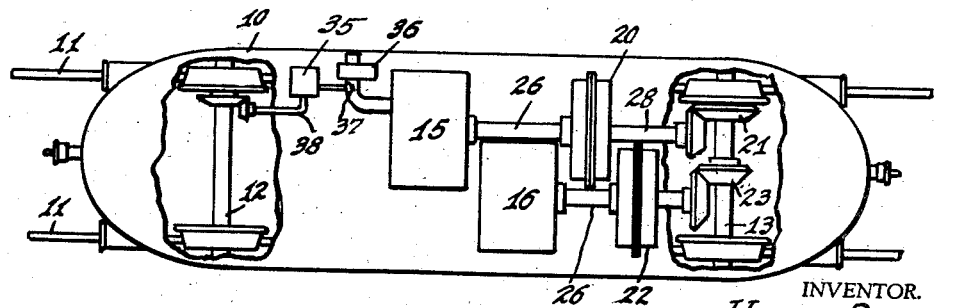
Fig. 7 is a view similar to Fig. 1 illustrating still another modification in which both engines drive the same set of traction wheels.

The arrangement shown in Fig. 7 is the same as that shown in Fig. 1 except that the engine 15, instead of being operatively connected through the coupling 20 and gear set 21 to the axle 12, is connected through the same mechanism to the axle 13, so that both engines are connected in common to a single set of drive wheels.

I claim as my invention:

1. Driving means for a vehicle having drive wheels, a pair of engines in said vehicle, a power transmission mechanism operatively connecting each engine with drive wheels, each of said mechanisms including a speed-responsive overrunning clutch, said power-transmitting mechanisms possessing gearing providing respectively different speed ratios.

2. Driving means as set forth in claim 1 with the addition that said engines have torque-output characteristics such that in the absence in slippage in said clutches the engines attain their respective maximum torque-outputs at different vehicle speeds.

3. Driving means as set forth in claim 1 with the addition that each said mechanism includes speed-reducing gearing, the clutch of each mechanism being connected between such gearing and the associated engine.

4. Driving means as set forth in claim 1 with the addition that each said clutch includes coaxial driving and driven members and a body of particulate material for transmitting torque from the driving member to the driven member.

5. Driving means as set forth in claim 1 with the addition of a governor responsive to vehicle speed and operative at and above a predetermined maximum speed to reduce the power output of that engine which is associated with the power-transmission mechanism possessing the greater speed ratio.

6. In combination, two engines, driven means to be driven jointly by said engines, a speed-responsive overrunning power-transmission mechanism for transmitting driving torque from each engine to said driven means, said engines and mechanisms being so constructed and arranged that in the absence of slippage in said mechanisms the engines attain respective maximum torque-outputs at different speeds of said driven means.

7. In combination, two engines, driven means to be driven jointly by said engines, a speed-responsive power-transmission mechanism for transmitting driving torque from each engine to said driven means, said engines and mechanisms being so constructed and arranged that in the absence of slippage in said mechanisms the engines attain respective maximum torque-outputs at different speeds of said driven means, the mechanism associated with the engine which attains its maximum torque ouput at the lower speed of said driven means including an overrunning clutch.

8. The combination of claim 7 with the addition of a throttle for that engine whose power-transmission mechanism includes said overrunning clutch, and a governor responsive to the speed of said driven means and operative at and above a predetermined speed of the driven means to move the throttle toward closed position.

References Cited in the file of this patent
UNITED STATES PATENTS

| | | |
|---|---|---|
| 1,173,877 | Severy | Feb. 29, 1916 |
| 2,255,773 | Heftler | Sept. 16, 1941 |
| 2,779,212 | Fell | Jan. 29, 1957 |